(12) United States Patent
Kentner et al.

(10) Patent No.: US 6,681,596 B2
(45) Date of Patent: Jan. 27, 2004

(54) DRYER FOR A REFRIGERATOR AND METHOD FOR MOUNTING THE DRYER

(75) Inventors: Wolfgang Kentner, Röfingen (DE); Helmut Steichele, Lauingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 19 days.

(21) Appl. No.: 10/371,127

(22) Filed: Feb. 21, 2003

(65) Prior Publication Data

US 2003/0140650 A1 Jul. 31, 2003

Related U.S. Application Data

(63) Continuation of application No. PCT/EP01/08912, filed on Aug. 1, 2001.

(30) Foreign Application Priority Data

Aug. 21, 2000 (DE) .......................... 100 40 852

(51) Int. Cl.[7] ................................ F25B 43/00
(52) U.S. Cl. .......................... 62/474; 62/513; 62/512; 62/514; 62/470
(58) Field of Search .................. 62/474, 512, 513, 62/514, 410

(56) References Cited

U.S. PATENT DOCUMENTS

| | | | | |
|---|---|---|---|---|
| 4,016,657 A | * | 4/1977 | Passey | 34/92 |
| 4,253,315 A | * | 3/1981 | Fiedler | 62/404 |
| 4,603,489 A | * | 8/1986 | Goldberg | 34/77 |
| 5,065,584 A | * | 11/1991 | Byczynski et al. | 62/81 |
| 5,357,768 A | * | 10/1994 | Van Steenburgh, Jr. | 62/292 |
| 5,419,144 A | * | 5/1995 | Kawaguchi et al. | 62/84 |
| 5,755,113 A | * | 5/1998 | Ferguson et al. | 62/474 |
| 5,953,934 A | * | 9/1999 | Makino et al. | 62/470 |
| 6,044,649 A | * | 4/2000 | Numoto et al. | 62/114 |

FOREIGN PATENT DOCUMENTS

| | | |
|---|---|---|
| DE | 26 56 664 A1 | 6/1978 |
| EP | 0 039 390 A3 | 11/1981 |
| EP | 0 209 418 A1 | 1/1987 |
| EP | 0 731 309 A1 | 9/1996 |
| GB | 895505 | 5/1962 |

* cited by examiner

Primary Examiner—William C. Doerrler
Assistant Examiner—Mark Shulman
(74) Attorney, Agent, or Firm—Laurence A. Green; Werner H. Stemer; Ralph E. Locher

(57) ABSTRACT

A dryer for a refrigerant circuit of a refrigerator includes a housing with a first and a second passage orifice. The cross-section of the first passage orifice includes a circular main portion, which is provided for receiving an evacuating line, and a lateral bulge, which is provided for receiving a capillary tube. A method for mounting the dryer is also provided.

33 Claims, 2 Drawing Sheets

DRYER FOR A REFRIGERATOR AND METHOD FOR MOUNTING THE DRYER

CROSS-REFERENCE TO RELATED APPLICATION

This application is a continuation of copending International Application No. PCT/EP01/08912, filed Aug. 1, 2001, which designated the United States and was not published in English.

BACKGROUND OF THE INVENTION

1. Field of the Invention

The present invention relates to a dryer for the refrigerant circuit of a refrigerator. Such dryers include a usually metallic housing that accommodates a drying agent, through which the refrigerant flows when the refrigerator is in operation and which has the task of absorbing and binding residual fractions of water in the refrigerant.

When such refrigerators are being assembled, after the refrigerating circuit has been filled with the refrigerant the air contained in the refrigerant circuit has to be removed therefrom. This is carried out with the aid of evacuating lines that are closed hermetically after evacuation has taken place. A preferred location for mounting such an evacuation line is the dryer. A known possibility for mounting the evacuating line on the dryer is to equip the housing of the dryer with three passage orifices, one being provided for connecting an inlet line for the refrigerant, a second being provided for connecting an outlet line and the third being provided for connecting the evacuating line. In a form of construction of a dryer that is shown in FIG. 1 and is used in practice by the applicant, its housing 1' has an elongate cylindrical configuration, at the ends of which are produced passage orifices 2', 3', 4' in the form of connection pieces. At the upper end of the housing 1', as seen in the figure, two passage orifices 3' and 4' serve for receiving a refrigerant supply line 5' that comes from a condenser and through which the refrigerant is supplied under high pressure to the dryer and for receiving an evacuating line 7', respectively.

A capillary tube connected to the small-format passage orifice 2' at the lower end of the housing serves for the expansion of the refrigerant after passage through the dryer. The double inlet required at the upper end makes the housing relatively complicated and costly to produce.

Another dryer housing used by the applicant is shown in FIG. 2. In this housing 1", the double connection at one end is avoided so that the housing 1" can be formed from copper in a cost-effective and simple way, for example, by shaping of a tubular piece. In this housing 1", a first passage orifice 2" is provided to receive both the evacuating line 7" and the capillary tube 6; the supply line 5 is connected to the second passage orifice 3".

A notch 8 is impressed into that end portion of the evacuating line 7" to be introduced into the passage orifice 2" and is dimensioned such that an end portion of the capillary tube 6 can be inserted into the notch 8 and the two end portions can be introduced jointly into the passage orifice 2 and soldered therein.

However, this solution is unsatisfactory for several reasons. On one hand, as a result of the notch 8, the free cross section of the evacuating line 7" is appreciably reduced so that the conductance of the evacuating line 7" is markedly reduced, as compared with an unshaped line 7'. The result of this, however, is that in a refrigerant circuit with the dryer from FIG. 2, the evacuating operation takes up markedly more time than in the case of a dryer from FIG. 1 with corresponding dimensions.

A further problem is that the impressing of the notch 8 must be carried out with high accuracy so as not to impair the free cross-section of the evacuating line 7" any more than is absolutely necessary, and in order to prevent the situation where the end region of the latter is pressed into the width and, for this reason, can no longer be introduced into the passage orifice 2.

A further difficulty arises when the dryer from FIG. 2 is being mounted. If the capillary tube 6 is introduced into the passage orifice 2 before the evacuating line 7", the capillary tube 6 cannot be fastened in the latter before the evacuating line 7" is put in place; if the evacuating line 7" is introduced first, the capillary tube 6 can no longer be subsequently pushed in. Consequently, three parts, to be precise, the housing 1", the evacuating line 7", and the capillary tube 6, have to be handled and connected to one another simultaneously, which is a laborious process. If the notch 8 is bent too sharply, moreover, it may happen that the capillary tube 6 comes to bear on the inner wall of the notch 8 at two points, thus making it difficult for solder to penetrate when the three parts are being soldered to one another. This may result in leaktightness or leakproofing problems.

SUMMARY OF THE INVENTION

It is accordingly an object of the invention to provide a dryer for a refrigerant circuit of a refrigerator and method for mounting the dryer that overcome the hereinafore-mentioned disadvantages of the heretofore-known devices and methods of this general type and that has a housing that can be manufactured simply and cost-effectively and that can easily be mounted and reliably sealed off.

With the foregoing and other objects in view, there is provided, in accordance with the invention, a dryer for a refrigerant circuit of a refrigerator, including a housing having first and second passage orifices, a cross-section of the first passage orifice defining a circular main portion and a lateral bulge.

Because the dryer of the invention requires only two passage orifices for the connection of three lines, it can be manufactured simply and cost-effectively. The cross-sectional shape of the first outlet orifice with a circular main portion and with a lateral bulge makes it possible to introduce and mount two lines of different diameter, the mounting of the narrower line not being obstructed when that having the larger cross-section has been mounted previously.

Mounting is particularly facilitated when the evacuating line carries a projection at its end provided for introduction into the housing. This projection can be led, during the introduction of the evacuating line, through the lateral bulge that is, then, still free; subsequently, the evacuating line is rotated about its axis so that the projection is no longer in alignment with the lateral bulge and the evacuating line is, thereby, secured against falling out, even when it is not yet connected firmly to the housing of the dryer. After rotation, the capillary tube can be pushed into the lateral bulge that is, then, free again.

The projection at the end of the evacuating line may be formed in a simple way by the expansion of the end of the evacuating line, for example by the introduction of a mandrel into the line.

The proposed dryer construction is suitable particularly for mounting in a refrigerator having a downwardly oriented first passage orifice. To be precise, securing the evacuating line against falling out makes it easier to solder the latter and the capillary tube to the housing only after the dryer has been mounted in the refrigerator, thereby avoiding stresses at the soldered joint that could otherwise arise if lines connected to the housing have to be shaped during the mounting of a ready-soldered refrigerating circuit in the refrigerator.

In accordance with another feature of the invention, the evacuating line has an end to be introduced into the housing and a projection at the end.

In accordance with a further feature of the invention, the main portion has a circular shape corresponding to an outer circumferential shape of an evacuating line, the evacuating line has an end to be introduced into the housing and a projection at the end, and the main portion and the lateral bulge are, together, adapted to receive the end of the evacuating line having the projection.

With the objects of the invention in view, in a refrigerator having a refrigerant circuit with a capillary tube for outletting refrigerant and an evacuating line, there is also provided a dryer, including a housing having first and second passage orifices, and a cross-section of the first passage orifice defining a circular main portion having a shape corresponding to the evacuating line and receiving the evacuating line and a lateral bulge having a shape corresponding to the capillary tube and receiving the capillary tube.

In accordance with an added feature of the invention, the main portion and the lateral bulge together receive the end of the evacuating line having the projection.

With the objects of the invention in view, there is also provided a refrigerator, including a refrigerant circuit having a capillary tube for outletting refrigerant, the capillary tube having a outer capillary shape and an evacuating line having an end, a projection at the end, an outer evacuating shape, and an outer end shape at the projection, and a dryer having a housing having first and second passage orifices and a cross-section of the first passage orifice defining a circular main portion having a shape corresponding to the outer evacuating shape, the circular main portion receiving the evacuating line, a lateral bulge having a shape corresponding to the outer capillary shape, the lateral bulge receiving the capillary tube, and the main portion and the lateral bulge together receiving the end of the evacuating line having the projection.

In accordance with an additional feature of the invention, there is provided a supply line connected to the second passage orifice.

In accordance with yet another feature of the invention, the second passage orifice faces upwards.

With the objects of the invention in view, there is also provided a method for mounting a dryer, including the steps of providing a housing having first and second passage orifices, a cross-section of the first passage orifice defining a circular main portion and a lateral bulge, introducing an evacuating line of a refrigerant circuit of a refrigerator into the main portion of the first passage orifice and securing the evacuating line against falling out, and subsequently introducing the capillary tube into the bulge.

With the objects of the invention in view, there is also provided a method for mounting a dryer, including the steps of providing a refrigerator with a refrigerant circuit having a capillary tube for outletting refrigerant having an outer capillary shape and an evacuating line having an outer evacuating shape, providing a dryer housing having first and second passage orifices, a cross-section of the first passage orifice defining a circular main portion having a shape corresponding to the outer evacuating shape and a lateral bulge having a shape corresponding to the outer capillary shape, introducing an evacuating line of a refrigerant circuit of a refrigerator into the main portion of the first passage orifice and securing the evacuating line against falling out, and subsequently introducing the capillary tube into the bulge.

With the objects of the invention in view, there is also provided a method for mounting a dryer, including the steps of providing a refrigerator with a refrigerant circuit having a capillary tube for outletting refrigerant, the capillary tube having a outer capillary shape and an evacuating line having an end, a projection at the end, an outer evacuating shape, and an outer end shape at the projection, providing a dryer housing having first and second passage orifices, a cross-section of the first passage orifice defining a circular main portion having a shape corresponding to the outer evacuating shape and a lateral bulge having a shape corresponding to the outer capillary shape, introducing the end of the evacuating line into the main portion of the first passage orifice with the projection engaging into the bulge, securing the evacuating line against falling out, and subsequently introducing the capillary tube into the bulge.

In accordance with yet a further mode of the invention, a projection is provided at the evacuating line, the evacuating line is introduced into the first passage orifice with the projection engaging into the bulge, and the evacuating line is secured against falling out by rotating the evacuating line in the first passage orifice.

In accordance with yet an added mode of the invention, a projection is provided at the evacuating line, the evacuating line is introduced into the first passage orifice with the projection engaging into the bulge until the projection enters an interior of the housing, and the evacuating line is secured against falling out by rotating the evacuating line in the first passage orifice to contact the projection against the interior of the housing.

In accordance with a concomitant mode of the invention, there are provided the steps of providing an edge at the first passage orifice, preforming a bend at the capillary tube, and introducing the capillary tube into the bulge until the bend butts against the edge at the passage orifice.

Other features that are considered as characteristic for the invention are set forth in the appended claims.

Although the invention is illustrated and described herein as embodied in a dryer for a refrigerator and method for mounting the dryer, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
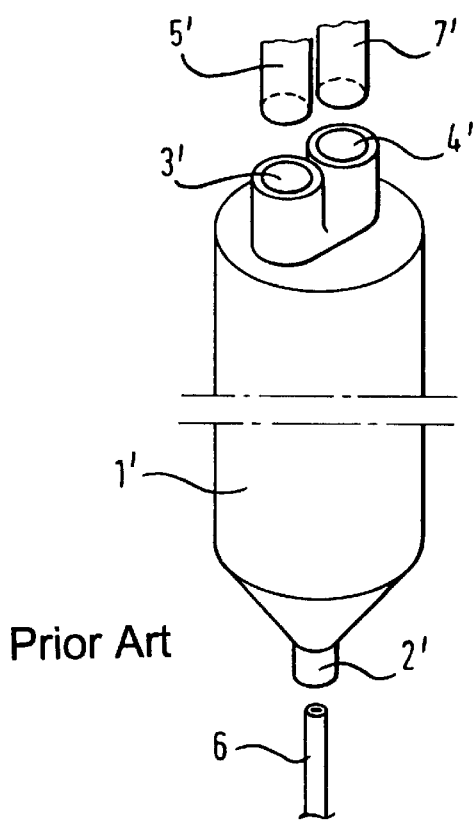
FIG. 1 is a fragmentary, perspective and partially hidden view of a prior art dryer for a refrigerant circuit of a refrigerator.
Figure 2:
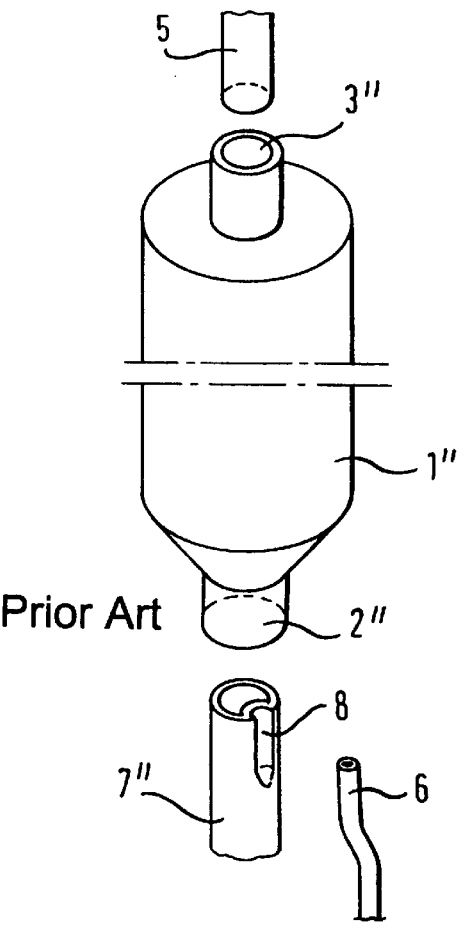
FIG. 2 is a fragmentary, perspective and partially hidden view of a prior art dryer for a refrigerant circuit of a refrigerator.
Figure 3:
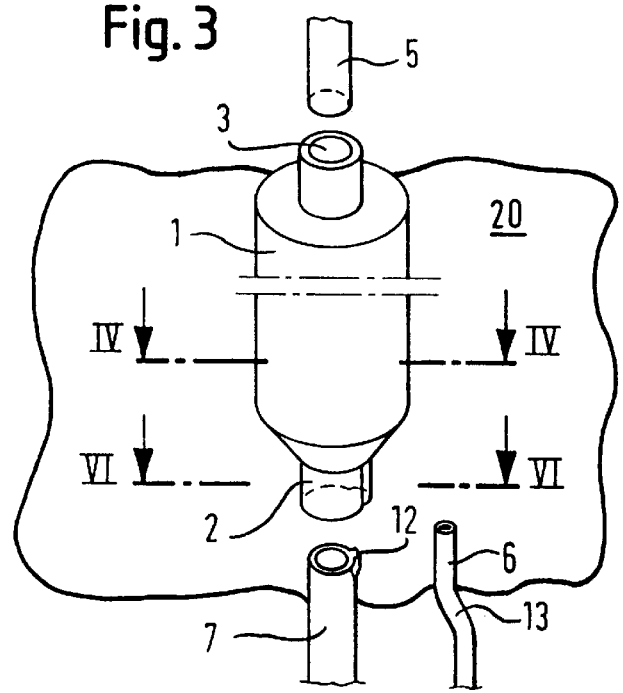
FIG. 3 is a fragmentary, perspective and partially hidden view of a dryer according to the invention in a refrigerator.
Figure 4:
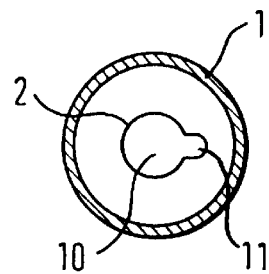
FIG. 4 is a cross-sectional view through the dryer of FIG. 3 along sectional line IV—IV in FIG. 3.

Referring now to the figures of the drawings in detail and first, particularly to FIG. 3 thereof, there is shown a dryer having a substantially cylindrical housing 1 made from copper tubing, at each of the longitudinal ends of which is formed a passage orifice 2 and 3. The passage orifice 3 is formed by a cylindrical tubular connection piece that is provided in order to push in and solder a refrigerant supply line 5 coming from a condenser. The passage orifice 2 at the other end of the housing has a keyhole-like cross-section, the configuration of which can be seen clearly in the cross section of FIG. 4. The orifice includes a circular main portion 10 and a bulge 11 that is adjacent to the latter and that is shaped such that a circular pipeline of smaller diameter than that of the main portion 10 can be accommodated in the bulge 11 without engaging into the main portion 10. The housing 1 is to be placed in a refrigerator indicated diagrammatically by the fragmentary wall portion 20.

Figure 5:
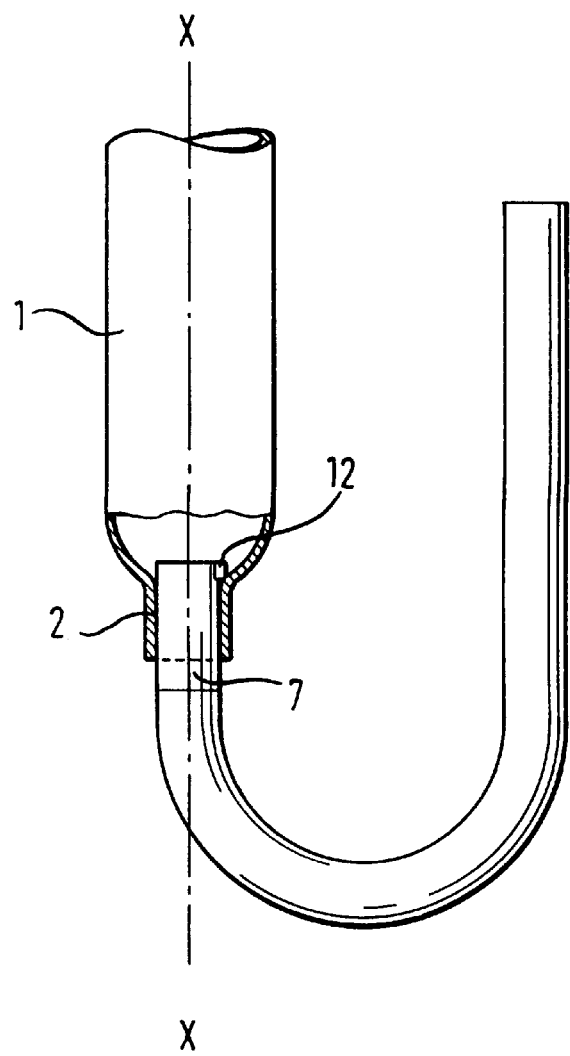
FIG. 5 is a fragmentary plan and partially cross-sectional view of the dryer of FIG. 3 along a vertical sectional plane after introduction of an evacuating line.
Figure 6:
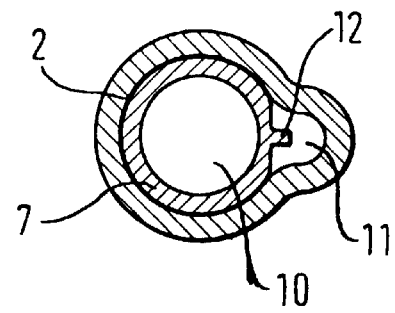
FIG. 6 is a cross-sectional view through the dryer of FIG. 3 along sectional line IV—IV in FIG. 3.

The evacuating line 7, which is shown below the passage orifice 2 in the exploded illustration of FIG. 3, has an outside diameter such that it can be introduced with slight play or even frictionally into the main portion 10 of the passage orifice 2. On that end portion of the evacuating line 7 that is provided for introduction into the housing 1, a projection 12 is formed outwardly by pressing or by the bending of the wall of the line 7, the radius of the projection being such that it does not fit into the main portion 10. To introduce the evacuating line 7 into the passage orifice 2, it is, therefore, necessary to orient the line 7 such that the projection 12 engages into the bulge 11. FIG. 6 shows a cross-section through the dryer 1, level with the passage orifice 2, during the introduction of the evacuating line 7 when the projection 12 engages into the bulge 11 in the specified way. When the end portion has run through the passage orifice 2, and the projection 12 is located completely within the housing 1, the evacuating line 7 can be rotated about the longitudinal axis, designated in FIG. 5 by line X—X, of the housing 1, with the result that the projection 12 lies on the upper edge of the passage orifice 2 inside the housing 1 (as shown in FIG. 5) and, thus, prevents the evacuating line 7 from falling out of the passage orifice 2, even without a permanent fastening. The capillary tube 6 can, then, be introduced into the bulge 11 that, in this state, is continuously free. A bent portion 13 is formed on the capillary tube at a predetermined distance from the ends of the capillary tube 6. When the bent portion 13 butts onto the edge of the passage orifice 2, the capillary tube cannot be introduced any further; the mounting position of the capillary tube is, thereby, predetermined, without measurement being necessary for such a purpose.

After the evacuating line 7 and the capillary tube 6 have been introduced into the passage orifice 2, as described, they can be both be soldered therein. Because the capillary tube 6 and the evacuating line 7 are in contact with one another at only one point on their circumference, there cannot be, along the circumference of the passage orifice 2, any regions that are cut off from the supply of solder and that could lead to leaks.

We claim:

1. A dryer for a refrigerant circuit of a refrigerator, comprising:

a housing having first and second passage orifices, a cross-section of said first passage orifice defining a circular main portion and a lateral bulge.

2. The dryer according to claim 1, wherein said lateral bulge is adapted to receive a capillary tube for outletting refrigerant.

3. The dryer according to claim 1, wherein said lateral bulge has a circumferential shape corresponding to an outer circumferential shape of a capillary tube for outletting refrigerant.

4. The dryer according to claim 1, wherein said main portion is adapted to receive an evacuating line.

5. The dryer according to claim 1, wherein said main portion has a circular shape corresponding to an outer circumferential shape of an evacuating line.

6. The dryer according to claim 5, wherein the evacuating line has an end to be introduced into said housing and a projection at the end.

7. The dryer according to claim 3, wherein:

said main portion has a circular shape corresponding to an outer circumferential shape of an evacuating line;

the evacuating line has an end to be introduced into said housing and a projection at the end; and said main portion and said lateral bulge are, together, adapted to receive the end of the evacuating line having the projection.

8. The dryer according to claim 6, wherein the projection is formed by an expansion of the end of the evacuating line.

9. The dryer according to claim 7, wherein the projection is formed by an expansion of the end of the evacuating line.

10. The dryer according to claim 1, wherein said housing is to be mounted in a refrigerator with said first passage orifice oriented facing down.

11. In a refrigerator having a refrigerant circuit with a capillary tube for outletting refrigerant and an evacuating line, a dryer, comprising:

a housing having first and second passage orifices; and a cross-section of said first passage orifice defining:

a circular main portion having a shape corresponding to the evacuating line and receiving the evacuating line; and a lateral bulge having a shape corresponding to the capillary tube and receiving the capillary tube.

12. The dryer according to claim 11, wherein the evacuating line has an end for inserting into said housing and a projection at the end.

13. The dryer according to claim 12, wherein said main portion and said lateral bulge together receive the end of the evacuating line having the projection.

14. The dryer according to claim 12, wherein the projection is formed by an expansion of the end of the evacuating line.

15. The dryer according to claim 1, wherein said housing is mounted in the refrigerator with said first passage orifice facing downwards.

16. A refrigerator, comprising:

a refrigerant circuit having:

a capillary tube for outletting refrigerant, said capillary tube having a outer capillary shape; and an evacuating line having an end, a projection at said end, an outer evacuating shape, and an outer end shape at said projection; and a dryer having:

a housing having first and second passage orifices; and a cross-section of said first passage orifice defining:

a circular main portion having a shape corresponding to said outer evacuating shape, said circular main portion receiving said evacuating line;

a lateral bulge having a shape corresponding to said outer capillary shape, said lateral bulge receiving said capillary tube; and said main portion and said lateral bulge together receiving said end of said evacuating line having said projection.

17. The refrigerator according to claim 16, wherein said projection is formed by an expansion of said end of said evacuating line.

18. The refrigerator according to claim 16, wherein said housing is mounted in the refrigerator with said first passage orifice facing downwards.

19. The refrigerator according to claim 16, wherein said first passage orifice faces downwards.

20. The refrigerator according to claim 19, including a supply line connected to said second passage orifice.

21. The refrigerator according to claim 20, wherein said second passage orifice faces upwards.

22. A method for mounting a dryer, which comprises:
providing a housing having first and second passage orifices, a cross-section of the first passage orifice defining a circular main portion and a lateral bulge;
introducing an evacuating line of a refrigerant circuit of a refrigerator into the main portion of the first passage orifice and securing the evacuating line against falling out; and
subsequently introducing the capillary tube into the bulge.

23. The method according to claim 22, which further comprises:
providing a projection at the evacuating line;
introducing the evacuating line into the first passage orifice with the projection engaging into the bulge; and
securing the evacuating line against falling out by rotating the evacuating line in the first passage orifice.

24. The method according to claim 22, which further comprises:
providing a projection at the evacuating line;
introducing the evacuating line into the first passage orifice with the projection engaging into the bulge until the projection enters an interior of the housing; and
securing the evacuating line against falling out by rotating the evacuating line in the first passage orifice to contact the projection against the interior of the housing.

25. The method according to claim 22, which further comprises:
providing an edge at the first passage orifice;
preforming a bend at the capillary tube; and
introducing the capillary tube into the bulge until the bend butts against the edge at the passage orifice.

26. A method for mounting a dryer, which comprises:
providing a refrigerator with a refrigerant circuit having:
a capillary tube for outletting refrigerant having an outer capillary shape; and
an evacuating line having an outer evacuating shape;
providing a dryer housing having first and second passage orifices, a cross-section of the first passage orifice defining:
a circular main portion having a shape corresponding to the outer evacuating shape; and
a lateral bulge having a shape corresponding to the outer capillary shape;
introducing an evacuating line of a refrigerant circuit of a refrigerator into the main portion of the first passage orifice and securing the evacuating line against falling out; and
subsequently introducing the capillary tube into the bulge.

27. The method according to claim 26, which further comprises:
providing a projection at the evacuating line;
introducing the evacuating line into the first passage orifice with the projection engaging into the bulge; and
securing the evacuating line against falling out by rotating the evacuating line in the first passage orifice.

28. The method according to claim 26, which further comprises:
providing a projection at the evacuating line;
introducing the evacuating line into the first passage orifice with the projection engaging into the bulge until the projection enters an interior of the housing; and
securing the evacuating line against falling out by rotating the evacuating line in the first passage orifice to contact the projection against the interior of the housing.

29. The method according to claim 26, which further comprises:
providing an edge at the first passage orifice;
preforming a bend at the capillary tube; and
introducing the capillary tube into the bulge until the bend butts against the edge at the passage orifice.

30. A method for mounting a dryer, which comprises:
providing a refrigerator with a refrigerant circuit having:
a capillary tube for outletting refrigerant, the capillary tube having a outer capillary shape; and
an evacuating line having an end, a projection at the end, an outer evacuating shape, and an outer end shape at the projection;
providing a dryer housing having first and second passage orifices, a cross-section of the first passage orifice defining:
a circular main portion having a shape corresponding to the outer evacuating shape; and
a lateral bulge having a shape corresponding to the outer capillary shape;
introducing the end of the evacuating line into the main portion of the first passage orifice with the projection engaging into the bulge;
securing the evacuating line against falling out; and
subsequently introducing the capillary tube into the bulge.

31. The method according to claim 30, which further comprises carrying out the securing step by rotating the evacuating line in the first passage orifice.

32. The method according to claim 30, which further comprises:
carrying out the evacuating line introducing step by introducing the evacuating line into the first passage orifice with the projection engaging into the bulge until the projection enters an interior of the housing; and
carrying out the securing step by rotating the evacuating line in the first passage orifice to contact the projection against the interior of the housing.

33. The method according to claim 30, which further comprises:
providing an edge at the first passage orifice;
preforming a bend at the capillary tube; and
carrying out the capillary tube introducing step by introducing the capillary tube into the bulge until the bend butts against the edge at the passage orifice.

* * * * *